United States Patent
Tschopp

[11] 3,909,705
[45] Sept. 30, 1975

[54] METHOD OF AND DEVICE FOR RECORDING SPIN RESONANCE SPECTRA

[75] Inventor: Werner Tschopp, Forch, Switzerland

[73] Assignee: Messrs. Spectrospin AG, Switzerland

[22] Filed: July 30, 1973

[21] Appl. No.: 383,657

[30] Foreign Application Priority Data
July 30, 1972 Germany.............................. 2237891

[52] U.S. Cl. ............................ 324/.5 R; 324/.5 AC
[51] Int. Cl.² ......................................... G01R 33/08
[58] Field of Search ............... 324/.5 R, .5 A, .5 AC

[56] References Cited
UNITED STATES PATENTS
| | | | |
|---|---|---|---|
| 3,651,396 | 3/1972 | Hewitt................................ | 324/.5 R |
| 3,781,650 | 12/1973 | Keller................................ | 324/.5 R |
| 3,786,341 | 1/1974 | Anderson.......................... | 324/.5 AC |

*Primary Examiner*—Alfred E. Smith
*Assistant Examiner*—Michael J. Tokar
*Attorney, Agent, or Firm*—Craig & Antonelli

[57] ABSTRACT

For recording spin resonance spectra the spins of a specimen located in a magnetic field are excited with a pulse-modulated radio-frequency signal (excitation signal). The signal furnished by the excited spins (received signal) in the pulse intervals of the excitation signal is pulse-modulated in such a manner that it is suppressed at least for the duration of the pulses of said excitation signal and that its phase changes by 180° from pulse to pulse. In this way the energy of the receiving signal is distributed to fewer frequency components and a substantial improvement of the signal-to-noise ratio is achieved. A device for performing the method comprises a radio-frequency generator for generating the carrier frequency, a pulse generator for generating a first pulse train with a predetermined pulse repetition frequency as modulation frequency, a first modulator furnishing a pulse- modulated radio-frequency signal coupled to said radio-frequency generator and said pulse generator, a specimen holder coupled to said modulator and located in a magnetic field, and a superheterodyne receiver coupled to said specimen holder, which superheterodyne receiver contains a modulating device to which a second pulse train, whose pulses fall into the intervals between the pulses of said first pulse train and have an alternating polarity, is applied by said pulse generator to modulate the signal received from said specimen holder.

9 Claims, 10 Drawing Figures

METHOD OF AND DEVICE FOR RECORDING SPIN RESONANCE SPECTRA

The present invention relates to a method of recording spin resonance spectra, comprising periodically exciting the spins of a specimen located in a magnetic field by means of a pulse-modulated radio-frequency signal (excitation signal) and processing the signal furnished by the excited spins (incoming or received signal) in the pulse intervals of the excitation signal.

According to this PFP (pulsed free precession) method, the specimen is subjected to pulse mode excitation at a high repetition frequency $f_m$. Each radio-frequency pulse excites the spin system so as to produce free precession oscillations. However, since the individual excitation pulses follow each other in very rapid succession, the spin system does not have time to return to its position of rest during the pulse intervals. Depending on the state of precession in which the spin system is at the time of the next excitation pulse, that excitation pulse will either boost or attenuate the precessional motion.

It can be shown that the carrier frequency $f_1$ and the repetition frequency $f_m$ must bear a specific relationship to the Larmor frequency $f_r$ of the spins to be excited if the individual excitation pulses are to boost and maintain the precessional motion of the spins. This relationship is $$f_1 \pm n \cdot f_m \cong f_r, n = 0, 1, 2 \ldots$$

The receiving equipment is switched off for the duration of the pulses of the excitation signal so that the excitation pulses cannot enter into the receiving equipment directly. Only after termination of each excitation pulse is the receiving equipment released by control pulses and can then receive and register the signals which are induced in a receiving coil by the excited spins.

The purposes of the PFP method is to avoid interference by portions of the excitation signal coupled directly to the receiver during processing of the incoming signal. However, the influence of the excitation signal on the operation of processing the incoming signal cannot be completely eliminated by the PFP method either because a continuous carrier signal must be generated before the pulse-modulated excitation signal can be produced and because it is possible that this carrier signal reaches the receiver employed for processing the incoming signal along paths which cannot be controlled. Furthermore, each pulse-modulated radio-frequency signal consists of a plurality of continuous oscillations, as can be proved by the Fourier analysis, which also enter into the receiving portion of a suitable spectrometer and there cause interference.

Although, for the reasons explained, the PFP method cannot completely prevent cross-talk by the excitation signal in the receiving portion of a spectrometer, it is to be preferred to other known methods regarding suppression of the excitation signal because it yields the best results at least expense. Among other methods for suppressing the excitation signal the one most frequently employed uses an audio-frequency modulation of the magnetic field to which the specimen is exposed. Since the precession frequency of the excited nuclei depends on the strength of the magnetic field, the incoming signal is modulated with the same frequency as the magnetic field. The receiver may then be tuned to the side bands of the incoming signal resulting from the frequency modulation so as to eliminate the cross-talking, unmodulated excitation signal. However, since the frequency selection can only take place in the audio-frequency part of the receiver, there is a risk that the excitation signal entering the receiver saturates the highly sensitive receiver, thus interfering with an effective processing of the incoming signal. It is, therefore, necessary to provide bridge circuits which prevent the excitation signal from entering the receiver. However, such bridge circuits are very critical in their design and require frequent readjustment. Furthermore, the modulation of the magnetic field mechanically affects the specimen holder of a spectrometer in such a manner that the excitation signal entering the specimen holder is also subjected to a certain amount of frequency modulation and thus forms an interference component which is precessed together with the incoming signal. Finally, field modulation involves an optimum modulation index which, among other things, depends on the gyromagnetic factor $\gamma$ of each type of nucleus so that in the case of specimens containing several different types of nuclei it is impossible to adjust the optimum modulation index for all types of nuclei involved. Consequently, the application of field modulation for suppressing interference influences of the excitation signal in processing the incoming signal yields poorer results than the PFP method discussed above.

Accordingly, it is an object of the present invention to provide a method of recording spin resonance spectra which yields better results in suppressing the excitation signal than the known field modulation method and, at the same time, leads to a better signal-to-noise ratio than could hitherto be achieved by the PFP method.

In accordance with the invention, this object is accomplished by a procedure whereby, in applying a method of the kind described herein first above, the incoming signal is also pulse-modulated in such a manner that it is suppressed at least for the duration of the pulses of the excitation signal and that its phase position is changed by 180° from pulse to pulse.

What is achieved thereby is that the energy of the incoming signal is distributed among fewer frequency components than that of an incoming signal modulated without a change of phase position, such as in the case of a periodically blocked receiver. The frequency components thus eliminated include, in particular, the component with the carrier frequency of the incoming signal, i.e. the frequency of the nuclear signal. If, then, the two frequency components adjacent to the carrier frequency are utilized for reception, a substantially higher portion of the energy of the incoming signal is used than has been possible heretofore, resulting in a substantial improvement of the signal-to-noise ratio. At the same time, decoupling of the receiver from the excitation signal is improved as well because the frequency components which are processed in the receiving channel are not contained in the excitation signal. Thus, both the signal-to-noise ratio and decoupling or isolation from the excitation signal are improved by the pulse modulation of the incoming signal in accordance with this invention and results are obtained which are superior to those obtainable by means of field modulation also as regards the signal-to-noise ratio.

In performing the method of the present invention, the spins may be excited with unchanging phase with the carrier frequency of the excitation signal and the first side bands of the phase-alternating modulated incoming signal, which are spaced from the carrier frequency at a distance corresponding to one half of the modulation frequency, can then be processed. This embodiment of the method in accordance with the invention can be regarded as its simplest version, differing from conventional methods only by the pulse modulation of the incoming signal with a 180° change in phase position from pulse to pulse.

The results which can be obtained by the method in accordance with this invention may be further improved if the excitation signal is also pulse-modulated with a 180° change in phase position from pulse to pulse and if the spins are excited with a side band of the excitation signal which is spaced from the carrier frequency at a distance corresponding to 1.5 times the modulation frequency and if those side bands of the incoming signal are processed which are spaced from the carrier frequency at a distance corresponding to the simple or double modulation frequency. Although this modification of the method in accordance with the present invention does not provide a further improvement of the signal-to-noise ratio, it does further improve the isolation of the incoming signal from the excitation signal because in this case no component of the excitation signal entering the receiver via cross-talk paths has a frequency which coincides with the frequency of the processed components of the incoming signal. Instead of the side band spaced from the carrier frequency at a distance corresponding to 1.5 times the modulation frequency it is, of course, generally possible to use a side band whose distance from the carrier frequency corresponds to (11 + 0.5) times, e.g. 2.5 or 3.5 times, the modulation frequency. In that case the side fractions of the incoming signals which are processed are those spaced from the carrier frequency at a distance corresponding to 11 or (11 + 1) times, i.e. 2 or 3 times or 3 or 4 times the modulation frequency.

As a further development of this invention, an amplitude modulation with a sine wave whose frequency is equal to half the pulse repetition frequency of the pulse modulation and whose zero points coincide with the mid-points of the spaces between successive pulses can be additionally imparted to the incoming signal modulated with alternating phase position, thereby achieving a modulation of the incoming signal which approximates that obtained with a sinusoidal signal. If modulated with a sinusoidal signal, the signal would have only two side bands spaced at a distance corresponding to the frequency of the sinusoidal signal so that the total energy of the incoming signal would be utilized in processing these two side bands. Thus, what is achieved by the additional amplitude modulation of the incoming pulse-modulated signal is that here, too, the energy of the incoming signal is practically distributed almost exclusively among the first two side bands of the incoming signal. This means that the signal-to-noise ratio is again further improved by this modification of the method in accordance with the present invention.

It is also an object of the present invention to provide a device for performing the method of this invention. To accomplish this object, the invention sets out from a conventional device comprising an oscillator for producing the carrier frequency, a pulse generator for generating a first pulse train with a predetermined pulse repetition frequency as modulation frequency, a first modulator coupled to said oscillator and said pulse generator which furnishes a pulse-modulated radio-frequency signal (excitation signal), a specimen holder coupled to said modulator and located in a magnetic field and a superheterodyne receiver coupled to said specimen holder. In accordance with the invention, the superheterodyne receiver includes a modulating device to which the pulse generator for modulating the incoming signal from the specimen holder applies a second pulse train whose pulses fall into the intervals between the pulses of said first pulses train and have an alternating polarity.

In a preferred embodiment of such a device, the receiver comprises a first mixer which converts the incoming signal to within an intermediate-frequency range, the modulating device comprises a second and a third modulator located in the path of the intermediate-frequency signal after the mixer and in the path of the heterodyne signal applied to the mixer respectively and second and third pulse trains are applied to the said two modulators, both of which pulse trains have the same pulse repetition frequency, the same pulse duty factor and the same phase position, while only one is comprised of pulses of alternating polarity.

If required by the method of this invention, the modulating device may also comprise a state for amplitude modulation of the incoming signal which has been pulse-modulated in a preceding stage, in which case a sine wave in synchronism with the second pulse train is applied to said amplitude-modulation state at half pulse repetition frequency by the pulse generator.

To enable the two symmetrical side bands of the excitation signal to be evaluated, the incoming signal is demodulated in two stages comprising a phase detection with a reference signal having the frequency of the excitation signal, which may have been converted to within the intermediate-frequency range, followed by a phase detection with a reference signal having a half the modulation frequency. Accordingly, two phase detectors are connected after the modulating unit in such a device in accordance with the invention and a reference signal having the frequency of the output signal, which may have been converted to within the intermediate-frequency range, is applied to the first phase detector, while a reference signal having half the modulation frequency is applied to the second phase detector.

According to one embodiment of the method in accordance with the present invention, the spins are excited by means of a side band of the excitation signal spaced from the carrier frequency at a distance corresponding to 1.5 times the modulations frequency. However, this side band is not separatley available for use as a reference signal so that it must be generated artifically. To allow for such and similar contingencies, one embodiment of the invention provides for the signal applied to the first phase detector to be produced by a controlled oscillator to which control signals are applied by the radio-frequency generator and the pulse generator.

As is generally known, the heterodyne and reference signals applied to the mixer and the phase detectors must have a specific phase position in order to obtain optimum results. According to a preferred embodiment of the device in accordance with this invention, phase shifters permitting such optimum adjustment of the phase positions of these heterodyne and reference signals are, therefore, located in the branches serving to apply said heterodyne and/or reference signals.

Further details and developments of the invention will become apparent from the following description of the embodiments are diagrams shown by way of example in the accompanying drawing. The features apparent from this description and the drawing may be used individually or jointly in any desired combination in other embodiments of this invention. In the accompanying drawing

Figure 1:
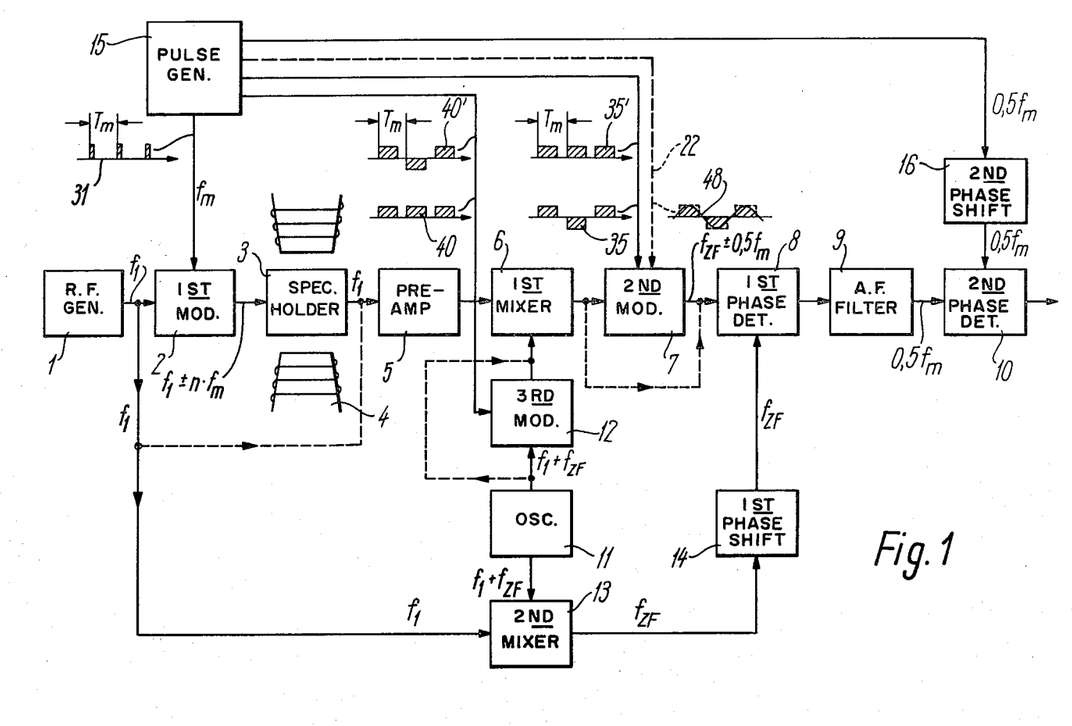
FIG. 1 is the block diagram of a first device in accordance with the invention.

The device shown in FIG. 1 comprises a radio-frequency generator 1 whose output signal is applied to a first modulator 2 whose output is coupled to a specimen holder 3. The specimen holder 3 is located within the magnetic field produced by a magnet 4. At the output end, the specimen holder 3 is followed by a pre-amplifier 5 whose output is connected to a first mixer 6. Connected to the output of this mixer is a second modulator 7 followed by a first phase detector 8, an audio-frequency filter 9 and a second phase detector 10. The first mixer 6 is heterodyned by a local oscillator 11 via a third modulator 12. The output signal of the local oscillator 11 also passes to a second mixer 13 to which the signal furnished by the radio-frequency generator 1 is applied in addition. The second mixer 13 furnishes a reference signal which is applied to the first phase detector 8 via a first phase shifter 14. The modulators 2, 7 and 12 receive the modulation signals comprised of pulse trains from a pulse generator 15 which also applies a sine-wave reference signal to the second phase detector 10 via a second phase shifter 16.

Figure 4:
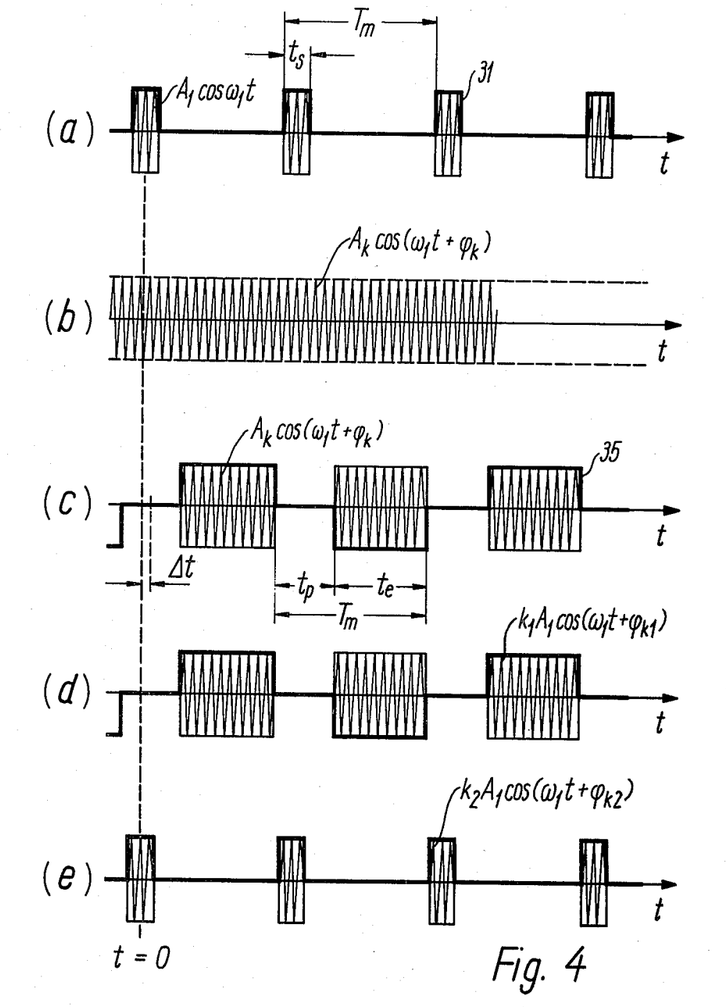

In operation, the radio-frequency generator 1 of the devide in accordance with FIG. 1 generates a radio-frequency oscillation having the frequency $f_1$ which is modulated in the first modulator 2 with a first pulse train 31 furnished by the pulse generator 15. This first pulse train 31, which is indicated in FIG. 1 and shown separately in line ($a$) of FIG. 4, has a pulse repetition frequenncy $f_m$ and, consequently, a pulse period $T_m$. The pulse width is $t_s$. As illustrated in line ($a$) of FIG. 4, the output signal of the first modulator 2 is thus a series of radio-frequency pulses having the carrier frequency $f_1$ or the carrier signal $A_1 \cos \omega_1 t$ where $A_1$ is the amplitude of the carrier signal and $\omega_1$ the radian frequency $2\pi f_1$. The frequency spectrum of the excitation signal represented in line ($a$) of FIG. 4 is shown in line ($a$) of FIG. 5. The frequency spectrum has a main line $A_1(t_s/T_m) \cos \omega_1 t$ and further frequency components at a distance of $1/T_m = f_m$.

Figure 5:
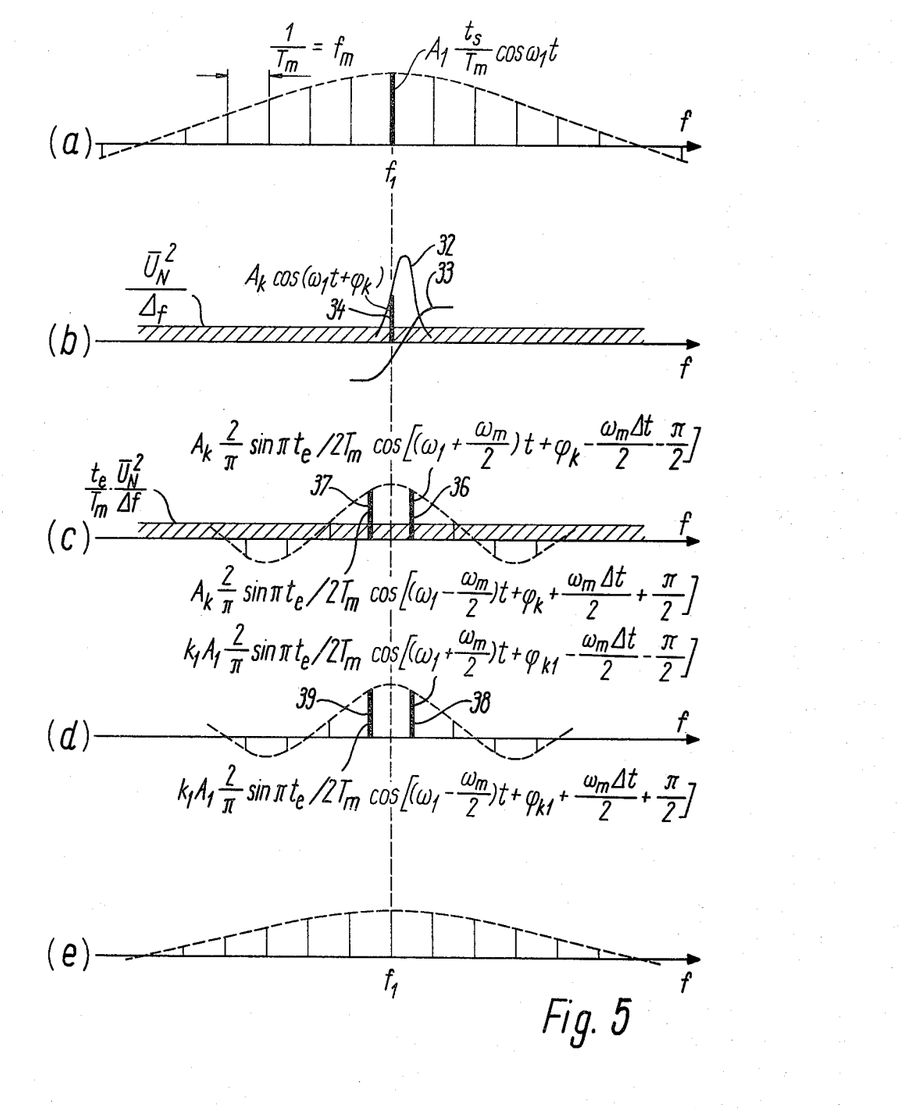

The frequency $f_1$ of the excitation signal and the modulation frequency $f_m$ are selected so that only that component of the excitation signal which has the frequency $f_1$ falls in the resonance curve 32 of a spin of the substance contained in the specimen holder 3 shown in line ($b$) of FIG. 5. Consequently, the spin is excited to oscillate with the frequency $f_1$ whose amplitude, according to the resonance curve 32, has the value $A_k$ and a phase shift $\phi_k$ with respect to the excitation signal, which phase shift results from the phase curve 33. Accordingly, the output signal furnished by the specimen holder 3 is a continuous oscillation $A_k \cos (\omega_1 t + \phi_k)$ which is shown as line 34 in line ($b$) of FIG. 5 and also represented as an oscillation cycle in line ($b$) of FIG. 4. In the device according to FIG. 1, the output signal of the speciment holder 3 described as incoming signal first passes through a pre-amplifier 5 and a first mixer 6 in which the pre-amplified signal is converted to within an intermediate-frequency range. The heterodyne signal required for conversion to within the intermediate-frequency range is provided by the local oscillator 11. Alternatively, the incoming signal can also be applied directly to the second modulator 7. In the case of the method illustrated with the aid of FIGS. 4 and 5, a second pulse train 35, which is shown separately in line ($c$) of FIG. 4 and whose pulses have an alternating polarity, is applied to the second modulator 7 by the pulse generator 15. The pulse repetition frequency $f_m$ is the same as that of the first pulse train 31 so that the pulse period is again $T_m$. The duration of the pulses is $t_e$ and the pulse spacing $t_p$. The phase relationship between the second pulse train 35 and the first pulse train 31 is such that the pulses of the second pulse train 35 fall into the intervals between the pulses of the first pulse train 31. The time interval $\Delta t$ shown in line ($c$) of FIG. 4 indicates the shift of the mid-point of the pulse interval of duration $t_p$ of the second pulse train 35 with respect to the mid-point of the pulse of the first pulse train 31. The frequency spectrum of the incoming signal modulated with the second pulse train 35 is as shown in line ($c$) of FIG. 5. The use of a pulse train with pulses of alternating polarity for modulating the incoming signal results in a carrier signal of the radio-frequency pulses with a 180° change in phase position from pulse to pulse. Consequently, the frequency spectrum includes no component with the carrier frequency and a substantial portion of the energy of the incoming signal is contained in the first two side bands 36 and 37 having the frequencies $f_1 + 0.5 f_m$ and $f_1 - 0.5 f_m$ respectively. The terms for the side bands 36 and 37 resulting from the Fourier transformation have been entered in FIG. 5.

Conversion of the incoming signal to within the intermediate-frequency range as employed in the case of the device of FIG. 1 does not change the conditions described. It would only be necessary to replace $f_1$ by $f_{i-f}$ and $\omega_1$ by $\omega_{i-f}$ in the terms mentioned above and entered in FIGS. 4 and 5.

The output signal of the second modulator 7 indicated in lines ($c$) of FIGS. 4 and 5 is then subjected to a first detection in the first phase detector 8. The reference signal is applied to the phase detector 8 via the phase shifter 14 either directly, if the incoming signal is not converted to within the intermediate-frequency range, or via a second mixer 13 which is heterodyned by the local oscillator 11 in the same manner as the first mixer 6 so that the output signal of the second mixer is a signal $f_{i-f}$ having the same frequency as the incoming signal converted to within the intermediate-frequency range. Thus, the output signal of the phase detector 8 is the signal freed from the carrier frequency $f_1$ or $f_{i-f}$ from which the components having the frequency $0.5 f_m$ are filtered out by means of the audio-frequency filter. In the second phase detector 10, the output signal of the audio-frequency filter 9 is subjected to a second detection by comparing it with a sine wave having the frequency $0.5 f_m$ furnished by the pulse generator 15, which sine wave is applied to the second phase detector 10 via the second phase shifter 16 in the proper phase position for an optimum result.

The quality of the method and device in accordance with the present invention results from the signal-to-noise ratio that can be obtained thereby and the influence exerted by portions of the excitation signal which cross-talk to the receiver. To enable the method of this invention to be compared with other methods in terms of signal-to-noise ratio, a standardized signal-to-noise ratio was determined for the known methods as well as for the method in accordance with this invention. The signal-to-noise ratio S/N of the device in accordance with the invention is given by the ratio of the maximum amplitude Y of the signal available at the output of the second phase detector 10 to the root-mean-square value of noise at the output of the second phase detector 10 which is given by the value $\sqrt{4\overline{U}_r^2}$.

The factor 4 results from the fact that the noise signal is folded twice during detection in the two phase detectors 8 and 10. Thus: $S/N = y / \sqrt{4\overline{U}_r^2}$.

For standardization, this signal-to-noise ratio is related to the signal-to-noise ratio which would be obtained without modulation of the incoming signal. As mentioned above, the unmodulated incoming signal has the form $A_k \cos(\omega_1 t + \phi_k)$. Since the unmodulated nuclear signal is heterodyned only once the noise band is also folded only once so that in this case an optimum signal-to-noise ratio of $(S/N)_{opt} = A_k / \sqrt{2\overline{U}_N^2}$ is obtained. The standardized signal-to-noise ratio F then results from the quotient of the signal-to-noise ratio actually obtained to the optimum signal-to-noise ratio with an unmodulated incoming signal. Thus, the standardized signal-to-noise ratio is $$F = \frac{S/N}{(S/N)_{opt}} = \frac{y}{A_k} \sqrt{\frac{\overline{U}_s^2}{2\overline{U}_r^2}}.$$

Figure 10:
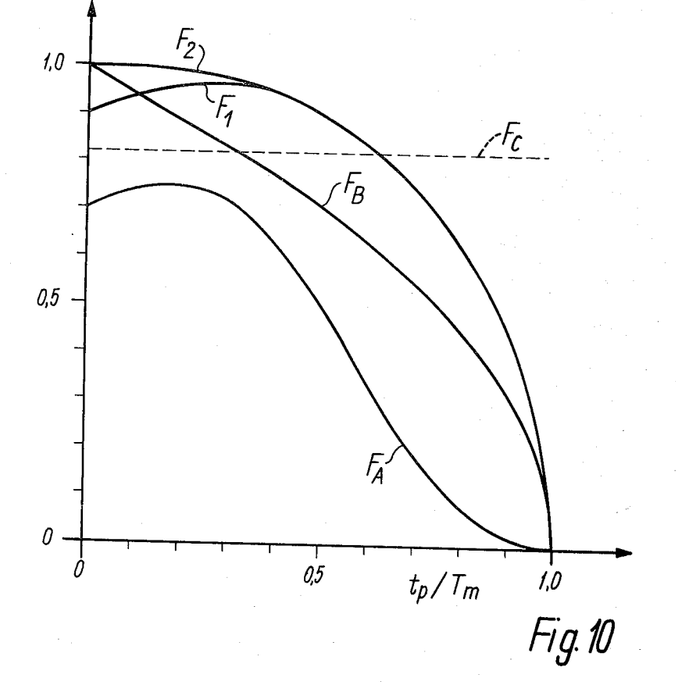
FIG. 10 is a diagram illustrating the signal-to-noise ratios which may be obtained by means of various different methods.

As is apparent from lines (b) and (c) of FIG. 5, the pulse duty factor $t_e/T_m$ selected for the modulation of the incoming signal influences not only the amplitude of the frequency components of the incoming signal but also the noise amplitude. Accordingly, the standardized signal-to-noise ratio F is also a function of the pulse duty factor or the complementary ratio of pulse spacing $t_p$ to pulse period $T_m$. The standardized signal-to-noise ratio $F_1$ for the method discussed with reference to FIG. 1 is shown in FIG. 10. It will be noted that the standardized signal-to-noise ratio $F_1$ lies above the value 0.9 in the range of $t_p/T_m$ between 0 and 0.5 moving toward 0 at a comparatively slow rate only beyond that range. This means that on the whole the standardized signal-to-noise ratio $F_1$ is substantially higher than the standardized signal-to-noise ratio $F_A$ obtained in the case of excitation of the spins by means of the first side band of a scanned excitation signal if the incoming signal is scanned with unchanging rather than alternating phase position and the transmission pulses are accurately centered in the reception interval. The curve $F_B$ represents the standardized signal-to-noise ratio for direct phase demodulation. Although the initial value thus obtained is higher, this value decreases rapidly as the value of the ratio $t_p/T_m$ increases so that for practically eligible pulse duty factors a good signal-to-signal noise ratio is no longer obtained. Finally, the standardized signal-to-noise ratio $F_C$ for recording the main band in the case of the field modulation method is also plotted in FIG. 10. It will be noted that the signal-to-noise ratio obtainable by applying the field modulation method is also exceeded by the method in accordance with the present invention in a wide range of $t_p/T_m$.

The advantages which the method of the present invention affords with respect to suppression of the excitation signal are illustrated by FIGS. 4 and 5. As indicated by broken lines in FIG. 1, there are essentially three cross-talk paths on which the excitation signal can pass into the receiver. On the first cross-talk path, the unmodulated carrier signal with the frequency $f_1$ furnished by the radio-frequency generator 1 enters the receiver even before the second modulator 7. Neglecting the conversion to within the intermediate-frequency range, the excitation signal which has passed into the receiver along the first cross-talk-path is modulated in the same manner as the incoming signal in accordance with the second pulse train 35. The result is the series of radio-frequency pulses with alternating phase position $k_1 A_1 \cos(\omega_1 t + \phi_{k1})$ represented in line (d) of FIG. 4. As shown in line (d) of FIG. 5, this signal has two components 38 and 39 whose frequencies coincide with those of the side bands 36 and 37 of the incoming signal. By a suitable design of the device, the amplitude of the first cross-talk signal can, however, be kept so small that this signal no longer causes interference.

Owing to the second and third cross-talk paths, the already modulated excitation signal shown in line (e) of FIG. 4 passes into the receiver. As is apparent from line (e) in FIG. 5, the frequency components $f_1 \pm n f_m$, where $n = 1, 2, 3 \ldots$, do not coincide with the frequency components of the incoming signal so that no interference can be caused by such a signal.

An advantageous arrangement is one in which the heterodyne signal applied to the first mixer 6 of the device in accordance with FIG. 1 by the local oscillator 11 is also modulated and, to that end, passed through the third modulator 12 to which a third pulse train 40, as represented in FIG. 1, is applied by the pulse generator 15. This third pulse train 40 is substantially similar to the second pulse train 35, except that its pulses have equal polarity. However, modulation of the incoming signal in such a manner that the carrier wave features a 180° phase shift from pulse to pulse can also be achieved if the third pulse train 40' applied to the third modulator 12 has an alternating polarity, while the second pulse train 35' applied to the second modulator 7 consists of pulses of unchanging polarity.

Figure 2:
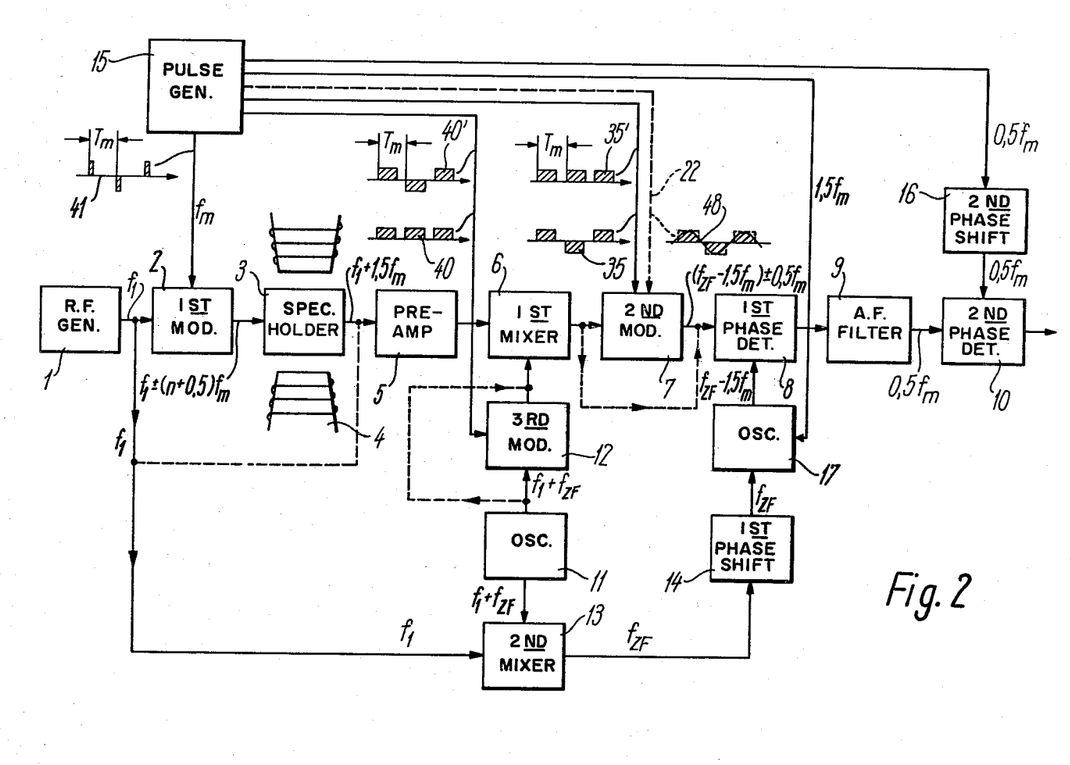
FIG. 2 is the block diagram of a second device in accordance with the invention.

The design of the device in accordance with the invention shown in FIG. 2 is substantially the same as that of the device in accordance with FIG. 1 so that it need not be discussed in detail. The only difference consists in the use of a controlled oscillator 17 in the branch between the first phase shifter 14 and the first phase detector 8 to which a control signal with a frequency of $1.5 f_m$ is applied by the pulse generator 15. The controlled oscillator 17 is necessary for the mode of operation which will now be described.

Figure 6:
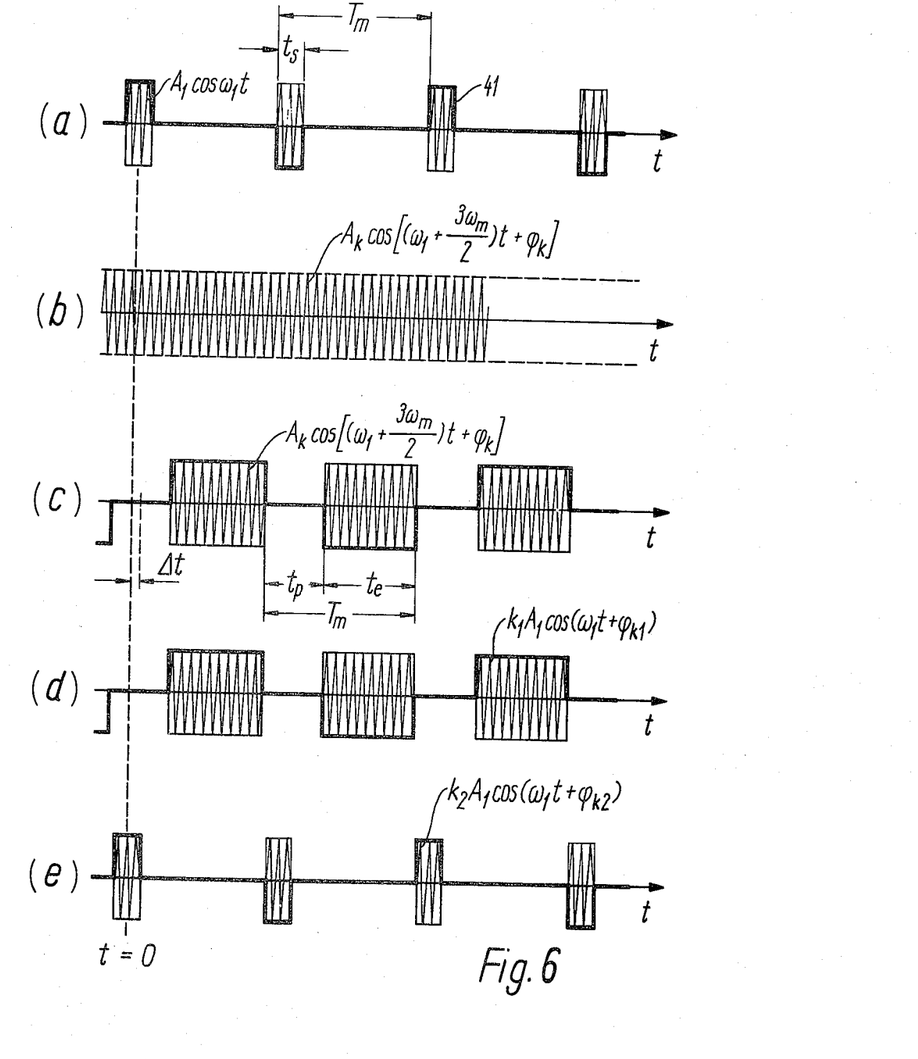
Figure 7:
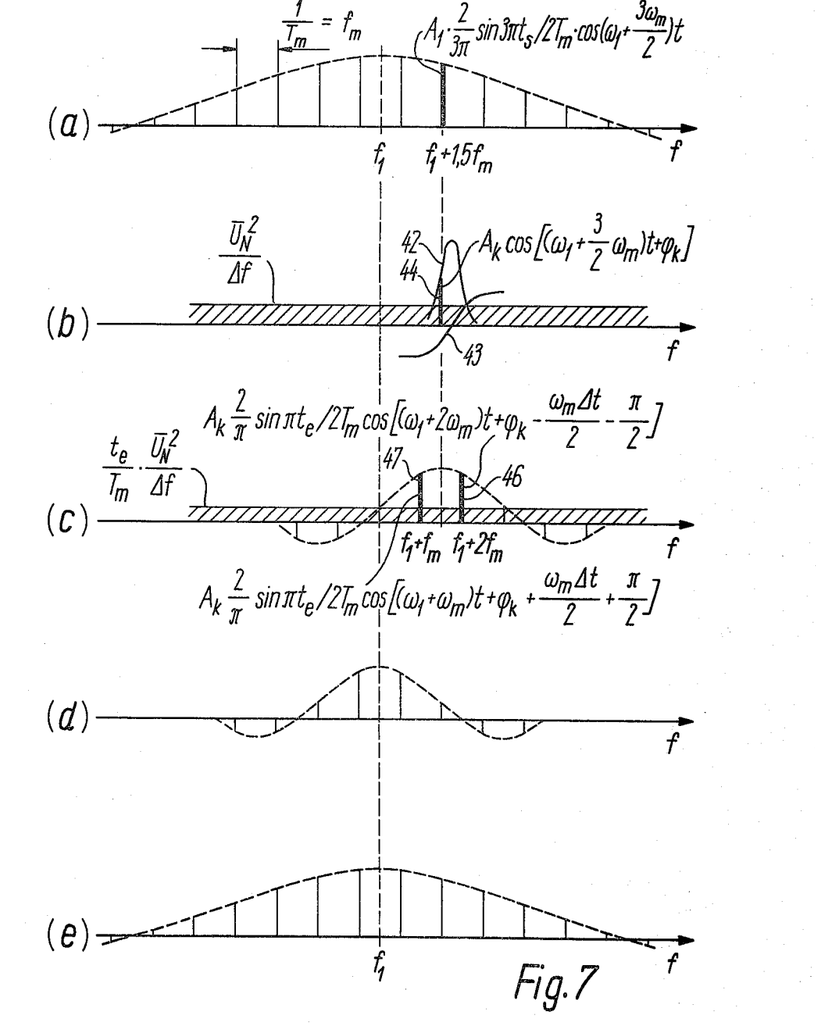

The method performed with the device in accordance with FIG. 2 differs from the method described with reference to FIG. 1 in that a first pulse train 41 whose pulses have an alternating polarity as shown in line (a) in FIG. 6 is applied to the first modulator by the pulse generator 15. Accordinly, the carrier wave furnished by the radio-frequency generator 1 has a polarity which changes 180° from pulse to pulse. Consequently, the frequency spectrum of the pulse train has no line with the frequency $f_1$, but lines with the frequencies $f_1 \pm (n + 0.5) f_m$. Of these lines, the line having the frequency $f_1 + 1.5 f_m$ is selected for exciting the nuclear signal, as shown in line (a) of FIG. 7. In accordance with the shape of the resonance curve 42 and the phase curve 43, a continuous nuclear signal is thus obtained whose line 44 and oscillation pattern are shown in line (b) of FIG. 7 and line (b) of FIG. 6 respectively. In the same way as with the method discussed by reference to FIGS. 1, 4 and 5, the nuclear signal is then processed as incoming signal in the receiver of the device in accordance with FIG. 2 and, neglecting the conversion to within the intermediate-frequency range, the signal shown in lines (c) of FIGS. 6 and 7 is obtained at the output of the second modulator 7. In the same way as with the device in accordance with FIG. 1, this signal is then further processed by a twofold detection. The terms expressing the signals produced have been entered in FIGS. 6 and 7 for this as well as for the preceding example. The standardized signal-to-noise ratio is practically the same as for the preceding example. The advantage of the method discussed here consists in that owing to the choice of the excitation frequency $f_1 + 1.5 f_m$ and the subsequent phase-alternating modulation in the second modulator 7 the incoming signal has the side bands 46 and 47 with the frequencies $f_1 + 2f_m$ and $f_1 + f_m$, while the cross-talk signals entering the receiver via the cross-talk paths are only subjected to phase-alternating modulation and, consequently, have only components with the frequencies $f_1 \pm n f_m$, i.e. components which differ from the components of the incoming signal. As a result, any interference with the incoming signal caused by the excitation signal is practically completely eliminated by this embodiment of the invention.

Figure 3:
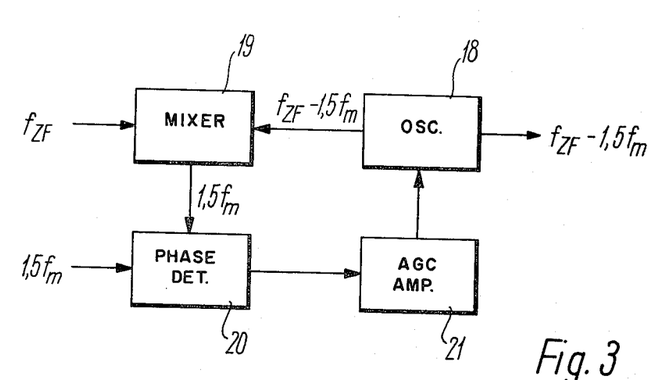
FIG. 3 is the block diagram of the controlled oscillator used in the device of FIG. 2, FIGS. 4 through 9 are time and frequency diagrams of signals involved in carrying out modifications of the method in accordance with the invention with the devices in accordance with FIGS. 1 through 3.

However, the embodiment in accordance with FIG. 2 presents one difficulty which consists in that a signal in the amount of $f_{i-f} - 1.5 f_m$, which is not freely available in the system, must be applied to the first phase detector 8. For this reason, the device in accordance with FIG. 2 includes the controlled oscillator 17 which furnishes an output signal having the frequency $f_{i-f} - 1.5 f_m$. To make sure that the output signal will have precisely the desired frequency, the controlled oscillator 17 is fed with a signal having the frequency $f_{i-f}$ applied by the second mixer 13 via the first phase shifter 11 as well as a signal having the frequency $1.5 f_m$ applied by the pulse generator 15. The controlled oscillator 17 itself may be designed as shown separately in FIG. 3. As will be noted from FIG. 3, the controlled oscillator contains an oscillator stage 18 which furnishes the output signal with the frequency $f_{i-f} - 1.5 f_m$. In addition to the first phase detector 8, this output signal is also applied to a separate mixer stage 19 which forms part of the controlled oscillator 17 and in which the output signal of the oscillator stage 18 is mixed with the signal having the frequency $f_{i-f}$ applied by the second mixer stage 13. The output signal of the mixer stage, which has the frequency $1.5 f_m$, is applied to a phase detector 20 to which the output signal of the pulse generator 15 having the frequency $1.5 f_m$ is applied as second input signal. In the event of differences in the phase and frequency positions between the two input signals applied, the phase detector 20 applies an output signal to an AGC amplifier 21 which so detunes the oscillator stage 18 that the two signals applied to the phase detector 20 remain identical. Thus, the oscillator stage 18 will always furnish an output signal which has the frequency $f_{i-f} - 1.5 f_m$ as well as the desired phase position.

Figure 8:
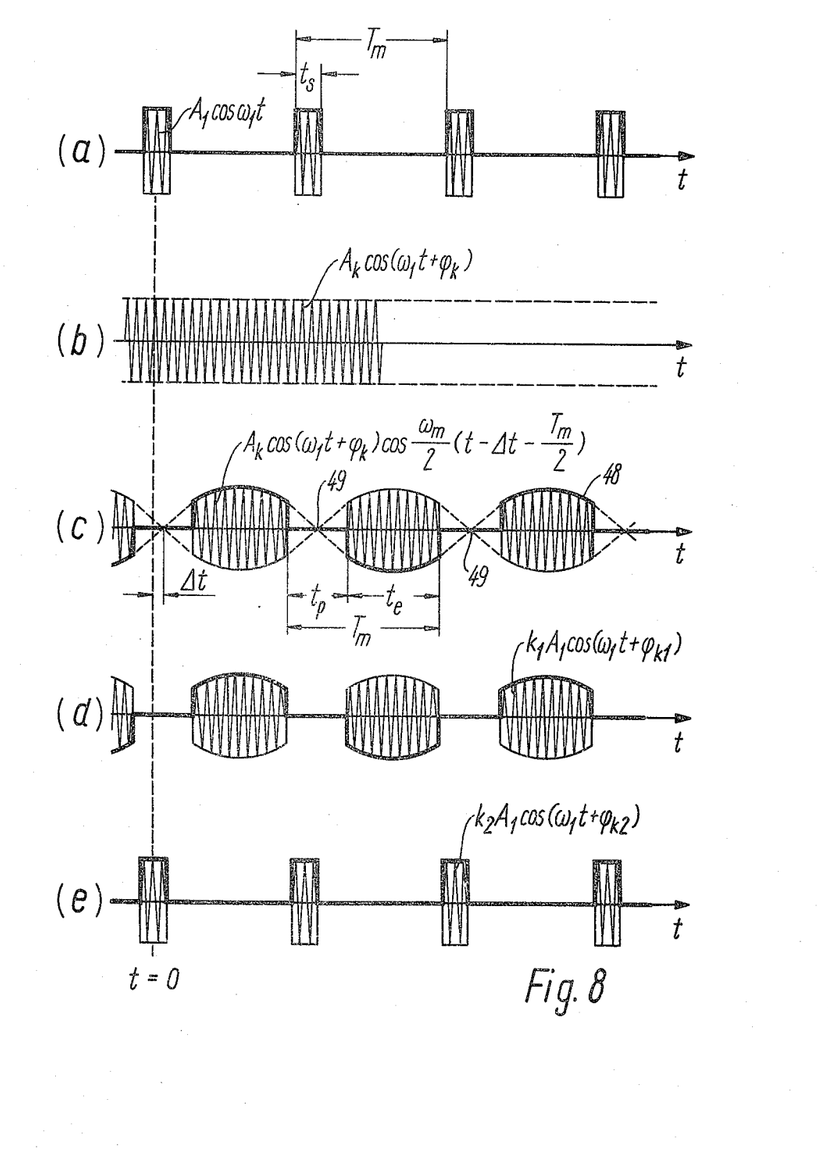
Figure 9:
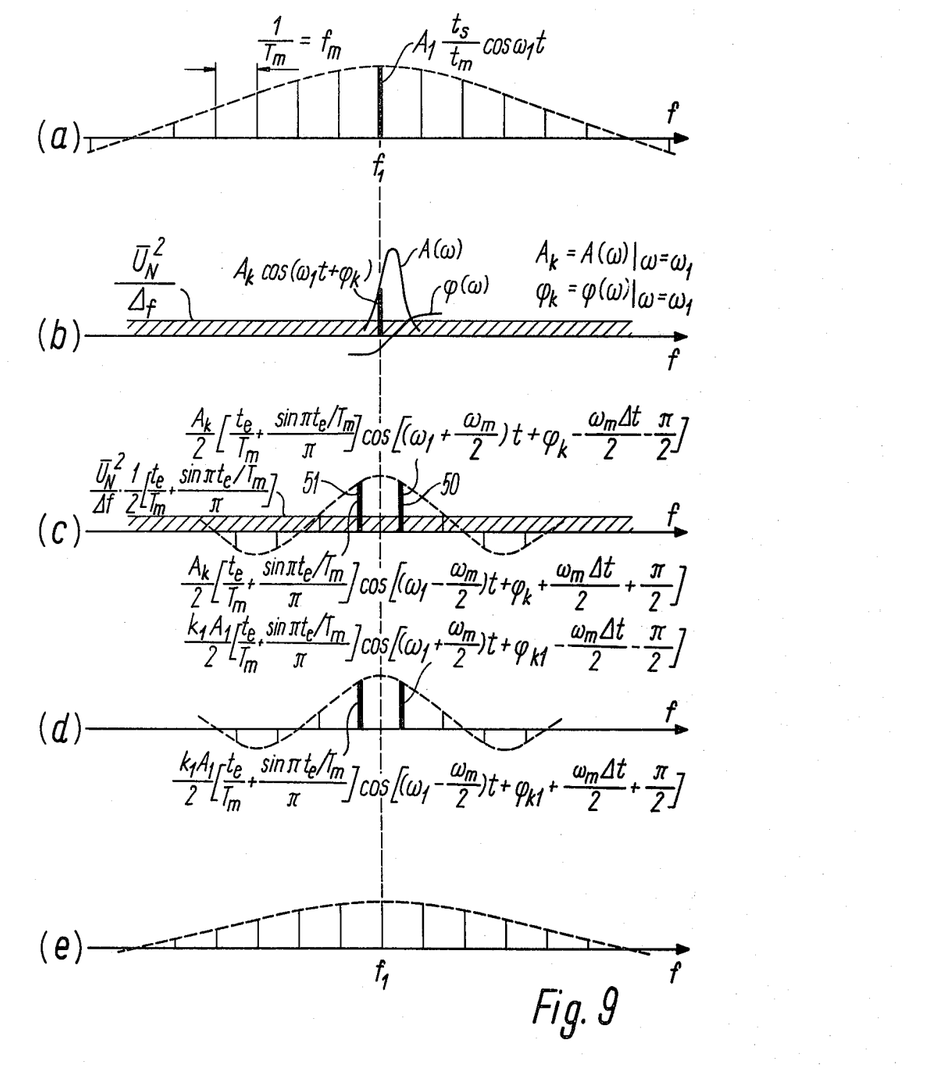

The devices in accordance with FIGS. 1 and 2 afford the possibility of imparting an additional amplitude modulation, as shown in line (c) of FIG. 8, to the phase-alternating pulse-modulated incoming signal by means of the second modulator. The sine wave 48 required for this amplitude modulation is applied to the second modulator 7 also by the pulse generator 15, as indicated by the broken line 22. The sine wave 48 furnished by the pulse generator 15 has half the frequency of the second pulse train 35 and such a phase position that its zero positions 49 coincide with the mid-points of the pulse intervals $t_p$. With a pure modulation of the incoming signal by a sine wave, the total energy of the incoming signal would be concentrated in the first two side bands. Although this result cannot be fully achieved by the pulse modulation, the energy content of the side bands 50 and 51 of the incoming signal is substantially increased, as is apparent from the terms corresponding to line (c) of FIG. 9. As a result, the signal-to-noise ratio is further improved and the standardized signal-to-noise ratio obtained is that indicated by the curve $F_2$ in FIG. 10. As will be noted, this signal-to-noise ratio starts at a value of 1.0 and still has a value of 0.99 at a value of $t_p/T_m$ which can already be used for practical applications. FIGS. 8 and 9 illustrate a modification of the method in accordance with the invention which, except for the additional amplitude modulation, is identical with the method illustrated by FIGS. 4 and 5. A further discussion of FIGS. 8 and 9 is, therefore, unnecessary. The comments made to explain the embodiment in accordance with FIGS. 1, 4 and 5 also apply in this case, in particular as regards the influence of cross-talk signals.

Naturally, the amplitude modulation can also be applied to the device in accordance with FIG. 2 and the method illustrated with the aid of FIGS. 6 and 7. Again, a standardized signal-to-noise ratio corresponding to the curve $F_2$ in FIG. 10 would be obtained, while the influences of cross-talk signals would be simultaneously eliminated.

What is claimed is:

1. A method of recording spin resonance spectra, comprising periodically exciting the spins of a specimen located in a magnetic field with a pulse-modulated radio-frequency excitation signal of high pulse repetition frequency such that the pulses follow one another so closely that only a specific spin type is excited, processing the signal furnished by the excited spins in the pulse intervals of the excitation signal in such a manner that said signal is suppressed at least for the duration of the pulses of said excitation signal and that its phase position changes 180° from pulse to pulse, and detecting the processed signal.

2. A method as claimed in claim 1, characterized in that the spins are excited with unchanging phase with the carrier frequency of the excitation signal and that the first side bands of the phase-alternating modulated signal, which are spaced from said carrier frequency at a distance corresponding to half the modulation frequency, are processed.

3. A method as claimed in claim 1, characterized in that the excitation signal is also pulse-modulated with a 180° change in phase position from pulse to pulse and the spins are excited with a side band of the excitation signal spaced from the carrier frequency at a distance corresponding to 1.5 times (2.5 times, 3.5 times . . . ) the modulation frequency and that those side bands of the incoming signal are processed which are spaced from the carrier frequency at a distance corresponding to the simple (double, triple . . . ) or double (triple, quadruple . . . ) modulation frequency.

4. A method as claimed in claim 1, characterized in that the signal modulated with phase alternation is additionally amplitude-modulated with a sine wave whose frequency is equal to half the pulse repetition frequency of the pulse modulation and whose zero positions coincide at least approximately with the midpoints of the interspaces between successive pulses.

5. A device for recording spin resonance spectra, comprising a radio-frequency generator for generating a carrier frequency, a pulse generator for generating a first pulse train with a predetermined pulse repetition frequency forming a modulation frequency, a first modulator connected to said radio-frequency generator and said pulse generator for furnishing a pulse-modulated radio-frequency output signal, a specimen holder coupled to said modulator and located in a magnetic field and a superheterodyne receiver coupled to said specimen holder, characterized in that said superheterodyne receiver contains a modulating device connected to said pulse generator to receive a second pulse train whose pulses fall into the intervals between the pulses of said fiest pulse train and have no alternating polarity to modulate the incoming signal from said specimen holder, and in which the receiver further comprises first mixer means for converting the incoming signal to within an intermediate-frequency range, and the modulating device comprises a second and a third modulator, of which one is located in the path of the intermediate-frequency signal after said first mixer means and the other in the path of the heterodyne signal applied to said first mixer means and means for applying second and third pulse trains to said second and third modulators, both of said second and third pulse trains having the same pulse repetition frequency, the same pulse duty factor and the same phase position, but only one being comprised of pulses of alternating polarity.

6. A device as claimed in claim 5, characterized in that the modulating device includes means for effecting amplitude modulation of the incoming signal to which a sine wave in synchronism with the second pulse train is applied by the pulse generator with half pulse repetition frequency.

7. A device as claimed in claim 6, characterized in that first and second phase detectors are connected in series to the output of said modulating device and means for applying a reference signal having the frequency of the excitation signal converted to within the intermediate-frequency range to the first phase detector, while a reference signal having half the modulation frequency is applied to the second phase detector.

8. A device as claimed in claim 7, characterized in that the reference signal applied to the first phase detector is produced by a controlled oscillator to which control signals are applied by the radio-frequency generator and the pulse generator.

9. A device as claimed in claim 8, characterized in that phase shifters are located in the branches serving to apply the heterodyne and reference signals, said phase shifters permitting an optimum adjustment of the phase positions of said heterodyne and reference signals.

\* \* \* \* \*